UNITED STATES PATENT OFFICE.

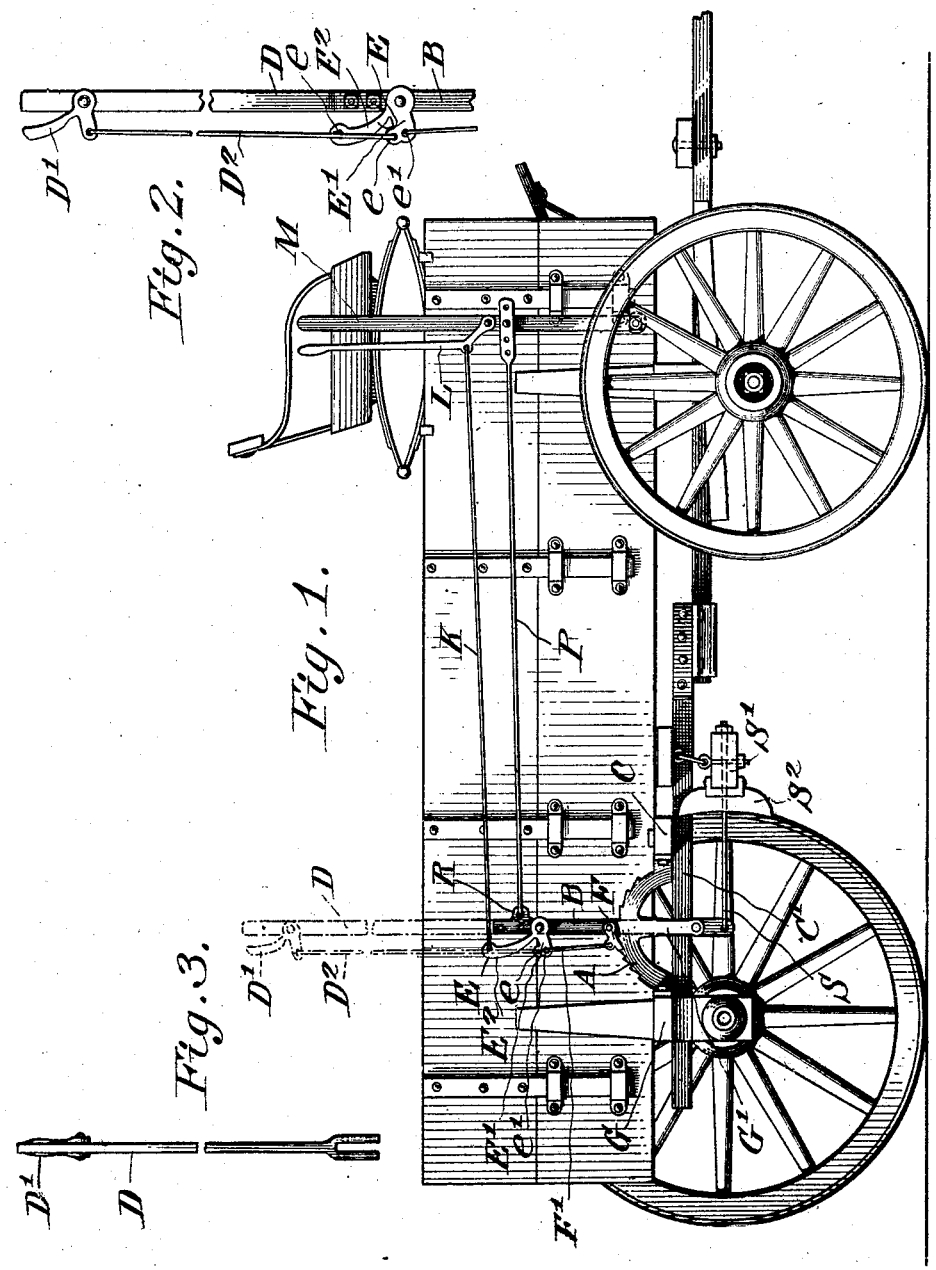

GEORGE A. PARKS, OF LEXINGTON, MISSOURI.

LOCK FOR WAGONS.

No. 915,623.  Specification of Letters Patent.  Patented March 16, 1909.

Application filed January 27, 1908. Serial No. 412,918.

*To all whom it may concern:*

Be it known that I, GEORGE A. PARKS, a citizen of the United States, residing at Lexington, in the county of Lafayette and State of Missouri, have invented a new and useful Wagon-Lock, of which the following is a specification.

The invention relates to improvements in wagon locks, and the primary object of the same is to generally improve the ordinary construction of locks for wagons or vehicles and to provide a simple and effective construction of a strong and durable nature and applied in such position as to be positive in its locking action with relation to the rear wheels of a wagon or vehicle and in obtaining a leverage which will render the operation of the blocks or shoes sensitively responsive to the actuation of the prime controlling means whatever may be the position of the latter with respect to the vehicle body.

The invention consists in the construction and arrangement of the several parts which will be more fully hereinafter specified.

In the drawing: Figure 1 is a side elevation of a wagon showing the improved lock applied thereto. Fig. 2 is a side elevation of the actuating lever and particularly illustrating a trip device coöperating with a pawl. Fig. 3 is a detail view in rear edge elevation of the lever.

Similar characters of reference are employed to indicate corresponding parts in the several views.

The lock embodying the features of the invention comprises a toothed segment or ratchet member A secured at opposite extremities to the bolster G and beam C of the wagon body and running gear, the beam C resting on and attached to the top portion of the hounds C'. The toothed segment or ratchet member A is fixed at opposite extremities respectively to the beam C and bolster G, as shown, and has a depending fulcrum extension G' terminating below the hounds C' and having a lever B movably attached to the lower end thereof and projecting upwardly inside of the segment or member A but exteriorly of the side of the wagon body. This lever B may be extended above the top of the wagon body as at D, see dotted lines, or it may have actuating devices running therefrom to the front of the wagon body adjacent to the driver's seat and which will be more fully hereinafter specified. Movably mounted on the outer side of the lever B in engaging relation to the segment or member A is a pawl or dog F connected by a rod F' to a tripping device E also movably applied to the outer side of the lever above the pawl or dog F. This trip device E has a rearwardly projecting short arm E' with upper and lower eyes $e$ and $e'$, the rod F' engaging the lower eye $e'$. The trip device E also includes an integral upwardly extending arm $E^2$. When the lever B is continued upwardly at the rear portion of the wagon body, as indicated at D, (dotted lines) it is provided at its upper extremity with a release lever D' of ordinary type and from which a rod $D^2$ projects and connects with the upper eye $e$ of the lower arm E' of the trip device E; and under these conditions the upper arm $E^2$ is unengaged. When it is desired to rotate the prime operating means for the lock adjacent to the driver's seat, a connecting rod K is attached to the upper end of the arm $E^2$ and projects forwardly and is connected to a release lever L movably applied to a prime operating lever M fulcrumed on the side of the wagon body adjacent to the driver's seat. A connecting rod P is also adjustably attached to the lever M and extends rearwardly to an eye R on the forward edge of the upper extremity of the lever B. The lower end of the lever B is attached by a coupling rod S to the brake beam S', the latter carrying the usual brake shoes or blocks $S^2$.

The operation of the improved lock will be readily apparent from the foregoing description, and it is obvious that by releasing the pawl or dog F from the toothed segment or ratchet member A, the lever B may be shifted either forwardly or rearwardly to apply or release the brake blocks or shoes $S^2$ with relation to the rear wheels of the vehicle. The pawl or dog F may be positively disengaged from the toothed segment or ratchet member A through the actuation of the trip device E, which, when drawn upwardly or forwardly in accordance with the actuating means connected thereto, will hold the said pawl or dog clear of the toothed segment or ratchet member until the trip device is relieved of the pulling strain exerted thereon, when it and the pawl will return to normal position to engage one of the teeth of the toothed segment or ratchet member in accordance with the adjustment or movement of the lever B.

The brake blocks or shoes $S^2$ may be very effectively locked in engagement with the rear wheels of the wagon by the operation of the mechanism explained, and it will be observed that in applying the improved lock as a whole, no modification of the wagon structure is required, and hence the said lock may be placed in operative position on any wagon or vehicle now in use.

Having thus described the invention, what is claimed as new, is:

The combination with a wagon body and running gear, of a toothed segment secured to a part of the body, a lever fulcrumed to a portion of the toothed segment and connected to the brake mechanism of the running gear, a pawl pivotally mounted on the lever to engage the segment, a trip device also pivotally mounted on the lever above the pawl and having upwardly and rearwardly projecting arms, the upwardly projecting arm being longer than the rearwardly projecting arm, a connection between the lower arm of the trip device and pawl, the lever having means connected thereto for swinging the same backwardly and forwardly in relation to the toothed segment, and a lever held on said means for swinging the lever fulcrumed to the segment and provided with a connection attached to the upwardly extending arm of the trip device whereby the brake mechanism of the running gear may be actuated either from the forward or rear portion of the wagon body.

GEORGE A. PARKS.

Witnesses:
W. F. WEIR,
J. F. WINN.